June 10, 1952
G. H. COOK
2,600,207
FOUR COMPONENT OPTICAL OBJECTIVES HAVING
FOUR INTERNAL CONTACT SURFACES
Filed April 3, 1950
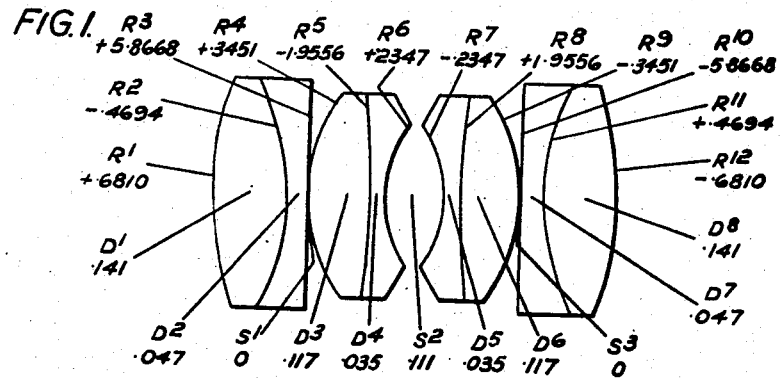
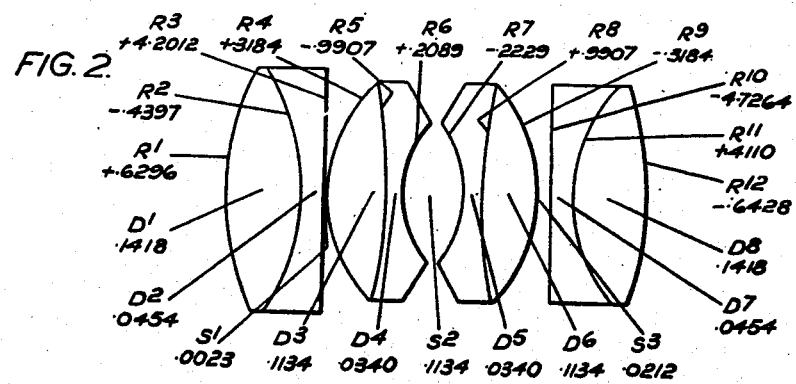
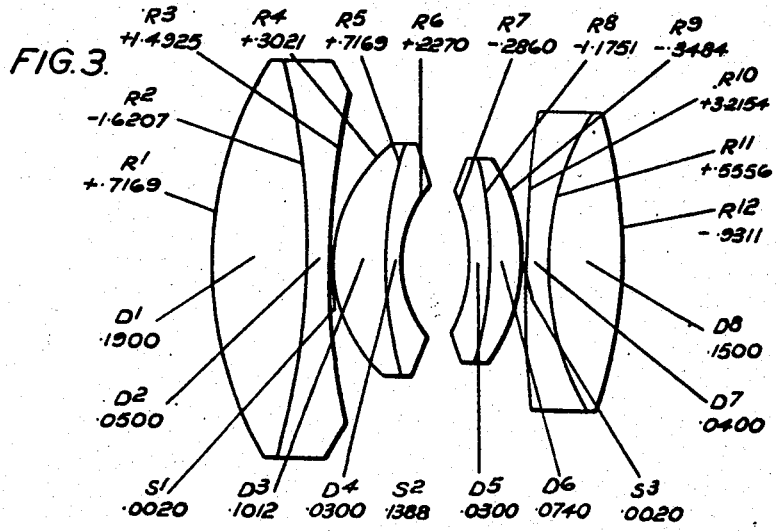
Inventor
Gordon H. Cook
By
Emery, Holcomb & Blair
Attorney Patented June 10, 1952

2,600,207

UNITED STATES PATENT OFFICE 2,600,207

FOUR COMPONENT OPTICAL OBJECTIVES HAVING FOUR INTERNAL CONTACT SURFACES

Gordon Henry Cook, Leicester, England, assignor to Taylor, Taylor & Hobson Limited, Leicester, England, a company of Great Britain Application April 3, 1950, Serial No. 153,517
In Great Britain April 4, 1949

21 Claims. (Cl. 88—57)

This invention relates to an optical objective for photographic or other purposes, corrected for spherical and chromatic aberrations, coma, astigmatism, field curvature and distortion, and comprising two divergent compound meniscus inner components which have their air-exposed surfaces concave towards a diaphragm between them and are located between two convergent outer components. Usually, in such objectives, the outer components are simple, and it has been proposed to control higher order, or zonal, spherical aberration by suitable arrangement of the internal contact surfaces in the inner components in relation to the mean refractive indices of the materials used in such components. In practice, however, it has usually been found that this aberration can only be reduced at the expense of oblique spherical aberration.

The present invention has for its object to provide an improved objective of this general type wherein the arrangement is such that zonal spherical aberration and oblique spherical aberration are both well corrected.

To this end, according to the invention, each of the four components of the objective is in the form of a doublet having a divergent inner element and a convergent outer element, and the mean refractive index of the material of the divergent element in each inner component exceeds that of the associated convergent element by between .03 and .12, whilst the mean refractive index of the material of the convergent element in each outer component exceeds that of the associated divergent element by between .05 and .20. The mean refractive index of the material of the convergent element in each outer component is preferably greater than 1.64.

The internal contact surfaces in the two outer components are preferably both convex towards the diaphragm, the radius of curvature of the contact surface in the front component lying between .33 and 5.0 times the equivalent focal length of the objective, whilst that in the rear component lies between .33 and 1.0 times such focal length. It should be made clear that the terms "front" and "rear" as herein used relate to the sides of the objective respectively nearer to and further from the longer conjugate in accordance with the usual convention.

The radii of curvature of the inner air-exposed surfaces of the inner components preferably lie between .15 and .35 times the equivalent focal length of the objective, those of the outer air-exposed surfaces of the inner components lying between .25 and .45 times such focal length. The inner air-exposed surfaces of the outer components preferably have radii of curvature greater than such equivalent focal length.

Preferably, the axial air separation between the two inner components lies between .075 and .20 times the equivalent focal length of the objective, the other two axial air separations each being less than .05 times such focal length.

One important use for the present invention is to give an improved objective, well corrected for a narrow field, but having a higher degree of correction than hitherto not only for zonal spherical aberration and oblique spherical aberration, but also for colour, and for this purpose the refractive index difference in each inner component is made less than .09 and that in each outer component less than .11, and the internal contact surface in each of the inner components is preferably cemented and convex towards the diaphragm with radius of curvature between .66 and 5.0 times the equivalent focal length of the objective, the internal contact surface in the front outer component preferably having a shorter radius of curvature than that in the front inner component whilst that in the rear outer component has a shorter radius of curvature than that in the rear inner component.

An alternate use for the invention is to enable vignetting to be avoided in an objective covering a wider field of view, by increasing the diameters of the various components beyond those necessary for the axial beam alone, in order to increase the amount of photographically useful light reaching extra-axial image points whilst still maintaining off-axis aberrations within close limits.

For this purpose, the internal contact surfaces in the two inner components are both concave towards the diaphragm, the radius of curvature of the contact surface in the front inner component lying between .5 and 5.0 times the equivalent focal length of the objective, and that in the rear inner component between .5 and 10.0 times such focal length.

The internal contact surfaces in the two outer components are preferably both convex inwardly towards the diaphragm, the outermost air-exposed surfaces of these components being convex outwardly, the radius of curvature of the contact surface in the front component being greater than that of the front surface of the objective, whilst the radius of curvature of the contact surface in the rear outer component is less than that of the rear surface of the objective.

The mean refractive index of the material of the divergent element in each inner component preferably exceeds that of the divergent element in either outer component by between .05 and .20.

The sum of the axial thicknesses of the two inner components lies between .18 and .30 times the equivalent focal length of the objective, and the sum of the optical powers of the two innermost surfaces of the objective lies numerically between 4.0 and 6.5 times the equivalent optical power of the objective, such two surfaces each being dispersive.

Conveniently, the rear surface of the front outer component is concave towards the diaphragm with radius of curvature between 1.0 and 5.0 times the equivalent focal length of the objective, whilst the front outer surface of the rear outer component is convex towards the diaphragm with radius of curvature between 2.0 and 10.0 times such focal length.

Some convenient practical examples of objective according to the present invention are illustrated in the accompanying drawings, in which:

Figures 1 and 2 show two alternative constructions of objective having a high degree of correction both for primary and oblique spherical aberrations over a relatively narrow field and, Figure 3 shows an example in which increased diameters are employed to avoid vignetting and thus to cover a wider angle of field.

Numerical data for these three examples are given in the following tables in which $R_1 R_2 \ldots$ represent the radii or curvature of the individual surfaces of the objective the positive sign indicating that the surface is convex to the front and the negative sign that it is concave thereto, $D_1 D_2 \ldots$ represent the axial thicknesses of the various elements of the objective, and $S_1 S_2 S_3$ represent the axial air separations between the components. The table also gives the mean refractive indices for the D-line and the Abbé V numbers of the materials of which the various elements are made.

*Example I*

| Equivalent focal length 1.000. Relative aperture F/2.0 | | | |
| --- | --- | --- | --- |
| Radius | Thickness or Air Separation | Refractive Index $n_D$ | Abbé V Number |
| $R_1 = +.6810$ | $D_1 = .141$ | 1.691 | 54.9 |
| $R_2 = -.4694$ | $D_2 = .047$ | 1.617 | 44.5 |
| $R_3 = +5.8668$ | $S_1 = 0$ | --------- | --------- |
| $R_4 = +.3451$ | $D_3 = .117$ | 1.576 | 58.9 |
| $R_5 = -1.9556$ | $D_4 = .035$ | 1.617 | 44.5 |
| $R_6 = +.2347$ | $S_2 = .111$ | --------- | --------- |
| $R_7 = -.2347$ | $D_5 = .035$ | 1.617 | 44.5 |
| $R_8 = +1.9556$ | $D_6 = .117$ | 1.576 | 58.9 |
| $R_9 = -.3451$ | $S_3 = 0$ | --------- | --------- |
| $R_{10} = -5.8668$ | $D_7 = .047$ | 1.617 | 44.5 |
| $R_{11} = +.4694$ | $D_8 = .141$ | 1.691 | 54.9 |
| $R_{12} = -.6810$ | | | |

*Example II*

| Equivalent focal length 1.000. Relative aperture F/2.0 | | | |
| --- | --- | --- | --- |
| Radius | Thickness or Air Separation | Refractive Index $n_D$ | Abbé V Number |
| $R_1 = +.6296$ | $D_1 = .1418$ | 1.6914 | 54.8 |
| $R_2 = -.4397$ | $D_2 = .0454$ | 1.6170 | 44.5 |
| $R_3 = +4.2012$ | $S_1 = .0023$ | --------- | --------- |
| $R_4 = +.3184$ | $D_3 = .1134$ | 1.5720 | 57.7 |
| $R_5 = -.9907$ | $D_4 = .0340$ | 1.6170 | 44.5 |
| $R_6 = +.2089$ | $S_2 = .1134$ | --------- | --------- |
| $R_7 = -.2229$ | $D_5 = .0340$ | 1.6170 | 44.5 |
| $R_8 = +.9907$ | $D_6 = .1134$ | 1.5720 | 57.7 |
| $R_9 = -.3184$ | $S_3 = .0212$ | --------- | --------- |
| $R_{10} = -4.7264$ | $D_7 = .0454$ | 1.6170 | 44.5 |
| $R_{11} = +.4110$ | $D_8 = .1418$ | 1.6914 | 54.8 |
| $R_{12} = -.6428$ | | | |

The first example shows the application of the invention to a symmetrical copying objective with unity magnification, whilst the second is an asymmetrical example giving a magnification of .46.

It will be noticed that the mean refractive index of the material of the convergent element of each outer component exceeds that of the associated divergent element by .0740 in Example I and by .0744 in Example II, whilst the mean refractive index of the divergent element of each inner component exceeds that of the associated convergent element by .0410 in Example I and .0450 in Example II.

All the internal contact surfaces are cemented and are convex inwards in both examples, the cemented surfaces in the outer components being more strongly curved than those in the inner components.

Both these examples give a high degree of correction for all the usual aberrations and also for zonal spherical aberration and oblique spherical aberration, over a limited angular field.

*Example III*

| Equivalent focal length 1.000. Relative aperture F/2.5 | | | |
| --- | --- | --- | --- |
| Radius | Thickness or Air Separation | Refractive Index $n_D$ | Abbé V Number |
| $R_1 = +.7169$ | $D_1 = .1900$ | 1.7183 | 48.1 |
| $R_2 = -1.6207$ | $D_2 = .0500$ | 1.5784 | 41.2 |
| $R_3 = +1.4925$ | $S_1 = .0020$ | --------- | --------- |
| $R_4 = +.3021$ | $D_3 = .1012$ | 1.6155 | 55.6 |
| $R_5 = +.7169$ | $D_4 = .0300$ | 1.7009 | 30.2 |
| $R_6 = +.2270$ | $S_2 = .1388$ | --------- | --------- |
| $R_7 = +.2860$ | $D_5 = .0300$ | 1.6993 | 41.4 |
| $R_8 = -1.1751$ | $D_6 = .0740$ | 1.6126 | 59.3 |
| $R_9 = -.3484$ | $S_3 = .0020$ | --------- | --------- |
| $R_{10} = +3.2154$ | $D_7 = .0400$ | 1.5784 | 41.2 |
| $R_{11} = +.5556$ | $D_8 = .1500$ | 1.7183 | 48.1 |
| $R_{12} = -.9311$ | | | |

It will be noticed that in this example the mean refractive index differences in the inner components are respectively .0854 and .0867, and those in the outer components are each .1399. The mean refractive indices of the materials of the divergent elements in the two inner components respectively exceed that of the divergent element in either outer component by .1225 and .1209.

The sum of the axial thicknesses of the two inner components amounts to .2352 times the equivalent focal length of the objective. The optical power of the rear surface of the front inner component (that is the mean refractive index difference across such surface divided by the radius of curvature of the surface) is −.7009/.2270, or approximately −3.09 times the optical power of the objective, the minus sign indicating that the surface is dispersive. Similarly, the optical power of the front surface of the rear inner component is −.6993/.2860, or −2.44 times the optical power of the objective, and the sum of the optical powers of these two surfaces thus amounts to about −5.53 times the optical power of the objective.

This example gives a high degree of correction not only for the primary aberrations but also for zonal spherical aberration, and for oblique spherical aberration, over a semi-angular field of 20 degrees. This is achieved owing to the fact that the improved oblique corrections make it possible to avoid objectionable vignetting by increasing the effective diameters of the various components above the values necessary for the axial beam alone. Thus the diameter of the front surface $R_1$ may be .77 times the equivalent focal length of the objective instead of .40 times such focal length, the value required for the axial beam alone, and the corresponding figures for other surfaces are for $R_4$ .46 instead of .33, $R_6$ .30 instead of .26, $R_7$ .27 instead of .24, $R_9$ .40 instead of .26 and $R_{12}$ .57 instead of .24, these figures relating to the chamfer diameter in cases where the element is chamfered off at its marginal edge.

It is of interest to note the changes of inclination of a principal ray which intersects the optical axis at the diaphragm position at the midpoint of the central air-space $S_2$, in the examples above given, these changes of inclination assisting materially in giving the high degree of correction for the various primary and secondary aberrations above mentioned. The following table shows the inclinations in degrees of such a principal ray to the optical axis in each of the three examples:

|  | Example I | Example II | Example III |
|---|---|---|---|
| Inclination in object space | 2.94 | 2.57 | 12.97 |
| Inclination in $D_1$ | 2.53 | 2.30 | 10.65 |
| Inclination in $D_2$ | 2.74 | 2.50 | 11.86 |
| Inclination in $S_1$ | 4.34 | 3.94 | 17.37 |
| Inclination in $D_3$ | 3.63 | 3.37 | 15.32 |
| Inclination in $D_4$ | 3.54 | 3.27 | 14.69 |
| Inclination in $S_2$ | 4.99 | 4.50 | 20.00 |
| Inclination in $D_5$ | 3.54 | 3.20 | 13.44 |
| Inclination in $D_6$ | 3.63 | 3.30 | 14.09 |
| Inclination in $S_3$ | 4.34 | 3.88 | 18.09 |
| Inclination in $D_7$ | 2.74 | 2.47 | 11.01 |
| Inclination in $D_8$ | 2.53 | 2.26 | 9.61 |
| Inclination in image space | 2.94 | 2.48 | 12.96 |

Thus the percentage increases in inclination in such rays in crossing the surface $R_2$ from $D_1$ to $D_2$ is 8 in Example I, 9 in Example II and 11 in Example III whilst the corresponding percentage increase from $D_8$ to $D_7$ across the surface $R_{11}$ is 8 in Example I, 9 in Example II and 15 in Example III, the mean figures of these percentage increases in the outer components thus being 8, 9 and 11 respectively.

Similarly in the inner components the percentage increases from $D_4$ to $D_3$ across the surface $R_5$ are 3 in Examples I and II and 4 in Example III, and from $D_5$ to $D_6$ across surface $R_8$ are 3 in Examples I and II and 5 in Example III giving means of 3, 3 and 5 respectively.

In these three examples, the four internal contact surfaces are all cemented, and whilst this will usually be preferable, it may sometimes be convenient to employ broken contacts in one or more of the components, that is for the two cooperating surfaces making up the contact to have slightly different radii of curvature. It should be made clear that a reference herein to the radius of curvature of an internal contact surface is to be understood in the case of a broken contact, as the harmonic mean between the actual radii of curvature of the cooperating surfaces.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

What I claim as my invention and desire to secure by Letters Patent is:

1. An optical objective, corrected for spherical and chromatic aberrations, coma, astigmatism, field curvature, and distortion, comprising two divergent compound meniscus inner doublet components each of which has its air-exposed surfaces concave to the other inner component and consists of a convergent outer element and a divergent inner element, the mean refractive index of the material of such divergent element exceeding that of such convergent element by between .03 and .12, and two convergent compound outer doublet components each of which consists of a divergent inner element and a convergent outer element made of a material whose mean refractive index exceeds that of the divergent element by between .05 and .20, the internal contact surfaces in the two outer components are both convex inwards, the radius of curvature of the contact surface in the front component lying between .33 and 5.0 times the equivalent focal length of the objective whilst that in the rear component lies between .33 and 1.0 times such focal length.

2. An optical objective as claimed in claim 1, in which the axial air separation between the two inner components lies between .075 and .20 times the equivalent focal length of the objective, whilst the other two axial air separations are each less than .05 times such focal length.

3. An optical objective, corrected for spherical and chromatic aberrations, coma, astigmatism, field curvature, and distortion, comprising two divergent compound meniscus inner doublet components each of which has its air-exposed surfaces concave to the other inner component and consists of a convergent outer element and a divergent inner element, the mean refractive index of the material of such divergent element exceeding that of such convergent element by between .03 and .12, and two convergent compound outer doublet components each of which consists of a divergent inner element and a convergent outer element made of a material whose mean refractive index exceeds that of the divergent element by between .05 and .20, the radii of curvature of the inner air-exposed surfaces of the inner components lying between .15 and .35 times the equivalent focal length of the objective, and those of the outer air-exposed surfaces of the inner components lie between .25 and .45 times such focal length, the mean refractive index of the material of the convergent element in each outer component being greater than 1.64.

4. An optical objective, corrected for spherical and chromatic aberrations, coma, astigmatism, field curvature, and distortion, comprising two divergent compound meniscus inner doublet components each of which has its air-exposed surfaces concave to the other inner component and consists of a convergent outer element and a divergent inner element, the mean refractive index of the material of such divergent element exceeding that of such convergent element by between .03 and .12, and two convergent compound outer doublet components each of which consists of a divergent inner element and a convergent outer element made of a material whose mean refractive index exceeds that of the divergent element by between .05 and .20, the curvature of the inner air-exposed surfaces of the outer components being greater than zero and less than the equivalent power of the objective, the mean refractive index of the material of the convergent element in each of such outer components being greater than 1.64.

5. An optical objective, corrected for spherical and chromatic aberrations, coma, astigmatism, field curvature, and distortion, comprising two divergent compound meniscus inner doublet components each of which has its air-exposed surfaces concave to the other inner component and consists of a convergent outer element and a divergent inner element, the mean refractive index of the material of such divergent element exceeding that of such convergent element by between .03 and .12, and two convergent compound outer doublet components each of which consists of a divergent inner element and a convergent outer element made of a material whose mean refractive index exceeds that of the divergent element by between .05 and .20, the inner air-exposed surfaces of the outer components having radii of curvature greater than the equivalent focal length of the objective, whilst the radii of curvature of the inner air-exposed surfaces of the inner components lie between .15 and .35 times such focal length and those of the outer air-exposed surfaces of such inner components lie between .25 and .45 times such focal length.

6. An optical objective as claimed in claim 1, in which the axial air separation between the two inner components lies between .075 and .20 times the equivalent focal length of the objective, whilst the other two axial air separations are each less than .05 times such focal length.

7. An optical objective, corrected for spherical and chromatic aberrations, coma, astigmatism, field curvature and distortion, comprising two divergent compound meniscus inner components each of which has its air-exposed surfaces concave to the other inner component, and two convergent compound outer components, each of the four components being in the form of a doublet having a divergent inner element and a convergent outer element, the mean refractive index of the material of the divergent element in each inner component exceeding that of the associated convergent element by between .03 and .09, and the mean refractive index of the material of the convergent element in each outer component exceeding that of the associated divergent element by between .05 and .11, the internal contact surfaces in the two inner components being convex towards each other and having radii of curvature between .66 and 5.0 times the equivalent focal length of the objective.

8. An optical objective as claimed in claim 7, in which the internal contact surfaces in the two outer components are both convex towards each other, the radius of curvature of the contact surface in the front component lying between .33 and 5.0 times the equivalent focal length of the objective whilst that in the rear component lies between .33 and 1.0 times such focal length.

9. An optical objective, corrected for spherical and chromatic aberrations, coma, astigmatism, field curvature and distortion, comprising two divergent compound meniscus inner components each of which has its air-exposed surfaces concave to the other inner component, and two convergent compound outer components, each of the four components being in the form of a doublet having a divergent inner element and a convergent outer element, the mean refractive index of the material of the divergent element in each inner component exceeding that of the associated convergent element by between .03 and .09, and the mean refractive index of the material of the convergent element in each outer component exceeding that of the associated divergent element by between .05 and .11, the inner air-exposed surfaces of the outer components having radii of curvature greater than the equivalent focal length of the objective, whilst the radii of curvature of the inner air-exposed surfaces of the inner components lie between .15 and .35 times such focal length and those of the outer air-exposed surfaces of such inner components lie between .25 and .45 times such focal length.

10. An optical objective, corrected for spherical and chromatic aberrations, coma, astigmatism, field curvature and distortion, comprising two divergent compound meniscus inner components each of which has its air-exposed surfaces concave to the other inner component, and two convergent compound outer components, each of the four components being in the form of a doublet having a divergent inner element and a convergent outer element, the mean refractive index of the material of the divergent element in each inner component exceeding that of the associated convergent element by between .03 and .09, and the mean refractive index of the material of the convergent element in each outer component exceeding that of the associated divergent element by between .05 and .11, the axial air separation between the two inner components lying between .075 and .20 times the equivalent focal length of the objective, and the other two axial air separations being each less than .05 times such focal length, the mean refractive index of the material of the convergent element in each outer component being greater than 1.64.

11. An optical objective, corrected for spherical and chromatic aberrations, coma, astigmatism, field curvature and distortion, and comprising two convergent compound outer components each of which consists of a divergent inner element and a convergent outer element made of a material whose mean refractive index exceeds that of the said divergent element by between .05 and .20, and two divergent compound meniscus inner components each of which has its air-exposed surfaces concave to the other inner component and consists of a convergent outer element and a divergent inner element made of a material whose mean refractive index exceeds that of such convergent element by between .03 and .12, the internal contact surface in the front inner component being convex to the front and having a radius of curvature between .5 and 5.0 times the equivalent focal length of the objective, and the internal contact surface in the rear inner component being concave to the front and having a radius of curvature between .5 and 10.0 times such focal length.

12. An optical objective as claimed in claim 11, in which the internal contact surfaces in the two outer components are both convex inwards, the radius of curvature of the contact surface in the front component lying between .33 and 5.0 times the equivalent focal length of the objective and that in the rear component lying between .33 and 1.0 times such focal length.

13. An optical objective as claimed in claim 11, in which the sum of the axial thicknesses of the two inner components lies between .18 and .30 times the equivalent focal length of the objective, and the sum of the optical powers of the two innermost surfaces of the objective lies numerically between 4.0 and 6.5 times the equivalent optical power of the objective, such two surfaces being dispersive.

14. An optical objective, corrected for spherical and chromatic aberrations, coma, astigmatism, field curvature and distortion, and comprising two convergent compound outer components each of which consists of a divergent inner element and a convergent outer element, and two divergent compound meniscus inner components each of which has its air-exposed surfaces concave to the other inner component and consists of a convergent outer element and a divergent inner element made of a material whose mean refractive index exceeds that of said convergent element by between .05 and .12, the internal contact surfaces in the two said inner components being concave towards each other and the radius of curvature of the contact surface in the front inner component lying between .5 and 5.0 times the equivalent focal length of the objective.

15. An optical objective as claimed in claim 14, in which the sum of the axial thicknesses of the two inner components lies between .18 and .30 times the equivalent focal length of the objective, and the sum of the optical powers of the two innermost surfaces of the objective lies numerically between 4.0 and 6.5 times the equivalent optical power of the objective, such two surfaces being dispersive.

16. An optical objective as claimed in claim 14, in which the rear surface of the front outer component is convex to the front and has radius of curvature between 1.0 and 5.0 times the equivalent focal length of the objective, whilst the front surface of the rear outer component is convex to the front and has radius of curvature between 2.0 and 10.0 times such focal length.

17. An optical objective as claimed in claim 14, in which the internal contact surfaces in the two inner components each have collective power greater than zero and less than .15 times the equivalent power of the objective.

18. An optical objective, corrected for spherical and chromatic aberrations, coma, astigmatism, field curvature and distortion, and comprising two divergent compound meniscus inner components each of which has its air-exposed surfaces concave to the other inner component and consists of a convergent outer element and a divergent inner element, the mean refractive index of the material of such divergent element exceeding that of such convergent element by between .03 and .12, and two convergent compound outer components each of which consists of a divergent inner element and a convergent outer element made of a material whose mean refractive index exceeds that of the divergent element by between .05 and .20, the internal contact surfaces in the divergent inner components having curvatures less than twice the equivalent optical power of the objective and powers lying between +.15 and −.1 times such equivalent optical power, the positive and negative signs respectively indicating collective and dispersive power.

19. An optical objective, corrected for spherical and chromatic aberrations, coma, astigmatism, field curvature and distortion, and comprising two divergent compound meniscus inner components each having its air-exposed surfaces concave to the other inner component, and two convergent compound outer components, each of the four components being in the form of a doublet having a divergent inner element, and a convergent outer element, the mean refractive index of the material of the divergent element in each inner component exceeding that of the associated convergent element by between .03 and .09, and the mean refractive index of the material of the convergent element in each outer component exceeding that of the associated divergent element by between .05 and .11, the internal contact surfaces in the divergent inner components being convex to each other and each having dispersive power greater than zero less than .1 times the equivalent power of the objective and curvature less than 1.5 times such equivalent power.

20. An optical objective, corrected for spherical and chromatic aberrations, coma, astigmatism, field curvature and distortion, and comprising two convergent compound outer components each of which consists of a divergent inner component and a convergent outer component made of a material whose mean refractive index exceeds that of the said divergent element by between .05 and .20, and two divergent compound meniscus inner components each of which has its air-exposed surfaces concave to the other inner component and consists of a convergent outer element and a divergent inner element made of a material whose mean refractive index exceeds that of such convergent element by between .05 and .12, the internal contact surfaces in the two inner components being concave towards each other and each having curvature less than twice the equivalent power of the objective and collective power greater than zero less than .15 times such equivalent power.

21. An optical objective corrected for spherical and chromatic aberrations, coma, astigmatism, field curvature and distortion, and comprising two divergent compound meniscus inner components each of which has its air-exposed surfaces concave to the other inner component and consists of a convergent outer element and a divergent inner element, the mean refractive index of the material of such divergent element exceeding that of such convergent element by between .03 and .12, and two convergent compound outer components each of which consists of a divergent inner element and a convergent outer element made of a material whose mean refractive index exceeds that of the divergent element by between .05 and .20, the sum of the curvatures of the internal contact surfaces of the two inner components being algebraically greater than the sum of the curvatures of the internal contact surfaces in the two outer components by less than 8 times the equivalent power of the objective (a curvature for this purpose being regarded as positive when the surface is concave towards the central air space and as negative when the surface is convex towards such air space).

GORDON HENRY COOK.

REFERENCES CITED

The following references are of record in the file of this patent:

FOREIGN PATENTS

| Number | Country | Date |
| --- | --- | --- |
| 321,078 | Great Britain | Oct. 31, 1929 |
| 376,044 | Great Britain | July 7, 1932 |
| 548,251 | Great Britain | Oct. 2, 1942 |
| 548,252 | Great Britain | Oct. 2, 1942 |
| 564,133 | Great Britain | Sept. 14, 1944 |
| 592,144 | Great Britain | Sept. 9, 1947 |
| 621,537 | Great Britain | Apr. 11, 1949 |